United States Patent Office 3,050,276
Patented Aug. 21, 1962

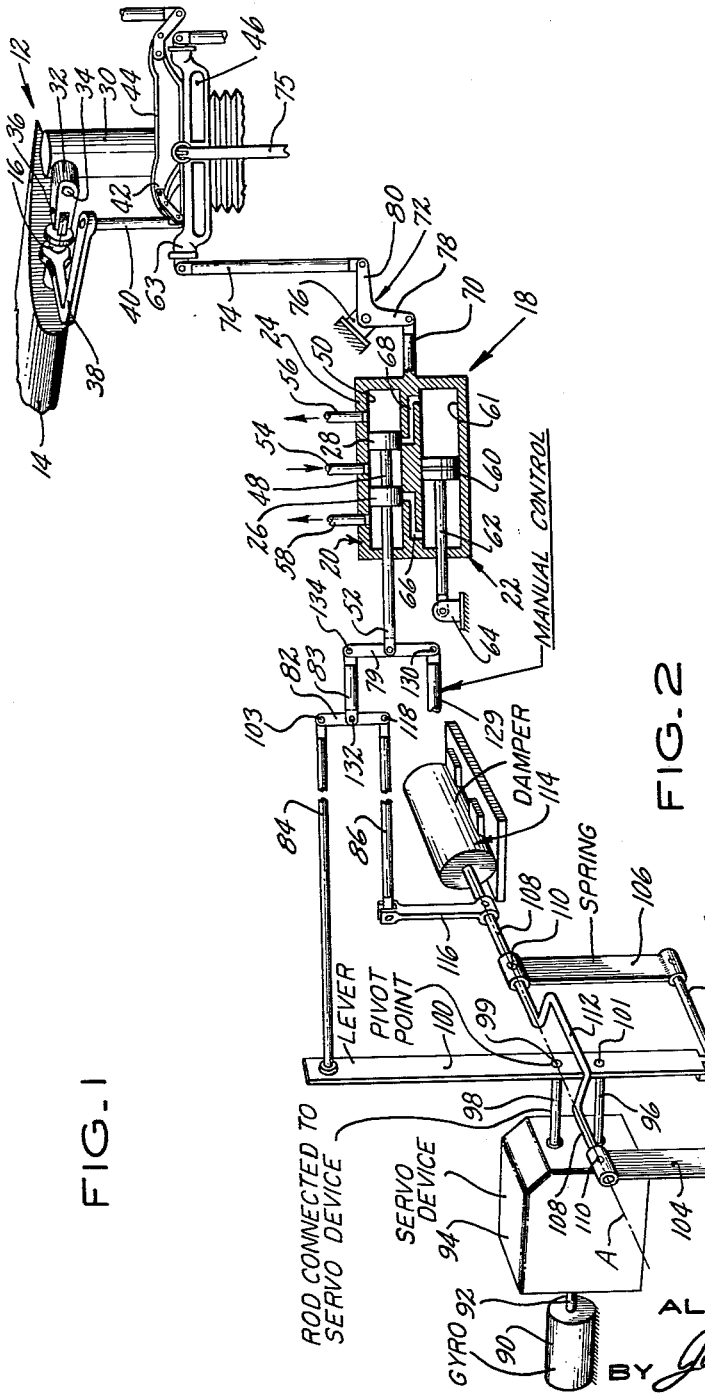

3,050,276
AUTOMATIC STABILIZATION DEVICE
Alan B. Wissinger, Westport, Conn., assignor to United Aircraft Corporation, East Hartford, Conn., a corporation of Delaware
Filed Sept. 2, 1958, Ser. No. 759,378
21 Claims. (Cl. 244—17.13)

This invention relates to a device for providing automatic stabilization in an inherently unstable helicopter. The inherently unstable helicopter will become stable with the addition of this device, permitting stick free operation for unlimited periods of time, both at zero air speed and during forward flight.

An object of the present invention is to stabilize inherently unstable helicopters and improve their handling and flying qualities. This would include "hands off" flight of the helicopter.

Another object of the present invention is to eliminate complicated electronic circuits as found now in some automatic stabilization equipment.

A further object of the present invention is to provide a unit which can be self-contained in a single package having a single hydraulic power source.

Another object of the present invention is to provide a control system for helicopter blades having a differential output wherein said blades are immediately moved when an unwanted rate of movement of the helicopter is sensed and the blades receive a time-lagged movement if the unwanted movement of the helicopter persists.

A further object of the present invention is to provide a means having a connection to an operating servo unit for direct movement thereof, said means also being connected to said servo unit through a spring-damper for movement of the servo unit in accordance with a time-lag function.

These and other objects and advantages of the invention will become apparent in connection with the detailed description of the embodiment of the invention shown in the accompanying figures.

FIG. 1 is a view of a device embodying the present invention in which it connects a sensing unit to a helicopter rotor. It is shown in its "null" position, i.e. no signal is being detected by the sensing unit.

FIG. 2 is a diagrammatic view of an electrical system which is the equivalent of applicant's mechanical embodiment.

The controlling flight surfaces or rotor blades of a helicopter are supported by a rotor head. For simplicity, only one blade 14 is shown supported on a rotor head generally indicated at 12. Each blade 14 is pivotally mounted for flapping movement about a horizontal hinge 34 by a flapping link 32 and pivotally mounted to the flapping link 32 for drag movement about an axis 36. Each blade is also mounted for movement about its longitudinal pitch changing axis 16. Each blade carries a horn 38 which is connected by a link 40 to an outstanding arm 42 on a rotatable swash plate member 44. This swash plate member 44 is journalled on a nonrotatable swash plate member 46. The swash plate mechanism is carried by rotor shaft 30. Movement of the swash plates serves to move the blades 14 about their pitch axes. A tilting movement of the swash plate mechanism about shaft 30 changes the pitch of the blades cyclically and movement of the swash plate mechanism axially along the shaft 30 changes the pitch of the blades collectively. Patent No. 2,755,870 shows a helicopter fuselage and rotor and is entitled "Hydraulic Booster Control of Helicopter Blade Pitch." This patent issued on July 24, 1956, to W. Gerstenberger.

While no fuselage is shown, it is to be understood that any conventional helicopter structure can be used such as referred to above. Further, while they are not shown, conventional control means are incorporated for direct operation by the pilot. Such controls are shown in many prior art patents.

The servo mechanism for controlling the swash plate mechanism in a plane pivotable about a lateral axis is shown generally at 18. This mechanism comprises a servo valve 20 and power unit 22. This valve 20 and power unit 22 are shown in a single housing 24. The servo valve 20 comprises a movable controlling piston unit including two pistons 26 and 28 interconnected by a rod 48. This unit is movable within a bore 50 in housing 24. A piston rod 52 is connected to said piston unit and extends through the housing 24 at one end of said bore 50 to the exterior thereof for actuating said piston unit. A fluid pressure line 54 is connected to the interior of bore 50 between pistons 26 and 28. A drain line 56 is connected to one end of bore 50 and a drain line 58 is connected to the other end.

Power unit 22 comprises a piston 60 movable in a bore 62 formed in housing 24. Piston 60 has a piston rod 62 which extends therefrom through housing 24 at one end of bore 62. Piston rod 62 is pivotally mounted to a bracket member 64 which is fixed to helicopter structure. A passageway 66 connects one end of bore 62, and therefore one side of piston 60, with bore 50. The opening of passageway 66 into bore 50 is covered by piston 26 in its stationary or centered position. A passageway 68 connects the other end of bore 62, and therefore the other side of piston 60, with bore 50. The opening of passageway 68 into bore 50 is covered by piston 28 in its stationary or centered position. The width of pistons 26 and 28 is slightly greater than the respective opening which it covers.

It can now be seen that movement of piston rod 52 will permit pressure to flow from fluid pressure line 54 either to one side or the other of power piston 60 depending on which direction it is moved. When fluid is admitted to one of the sides of piston 60, the other side is automatically connected to drain line 56 or 58. This movement will bodily move housing 24 either to the right or to the left. It is to be noted that the movement of housing 24 acts to follow up the movement of the piston unit of the servo valve and attempts to place the opening of passageways 66 and 68 into bore 50 under pistons 26 and 28, respectively. In order to convey this movement of housing 24 to the swash plate mechanism, an arm 70 extends from the end of the housing 24 and is connected by a bell crank lever 72 and link 74 to the nonrotatable swash plate member 46. The bell crank lever 72 is pivotally connected to a bracket 76 which is fixed to the helicopter. The free end of lever 70 is pivotally mounted to the free end of arm 78 of the bell crank lever 72. Link 74 is connected at one of its ends to the free end of the other arm 80 of bell crank lever 72 and at its other end to a boss 63 which extends from swash plate member 46.

The piston or actuating rod 52 has its free end connected to the center of a differential operating bar 79. A conventional pilot's control means has a member 129 pivotally connected to one end of bar 79 at 130. The other end of bar 79 is connected to a second differential bar 82 by a link 83. Link 83 is pivoted to bar 82 at 132 and is pivoted to bar 79 at 134. For the purpose of description of the automatic portion of this invention, member 129 can be considered as stationary so that bar 79 pivots about 130 to move or actuate rod 52. In manual operation member 129 moves to pivot bar 79 about 134. The sensing and control mechanism for automatically operating said servo mechanism comprises means having a differential output. This output includes two rods 84 and 86. Rod 84 is connected to one end of bar 82 at 103 and rod 86 is connected to the other end of bar 82 at 118. Rod 84 is immediately moved when a disturbance or unwanted movement of the helicopter is sensed and rod 86 receives a time-lagged movement if the disturbance or unwanted movement of the helicopter persists.

To sense the rate of angular displacement of the helicopter fuselage in pitch, a rate gyro 90 is used. This gyro is of the type which has an output rod 92 which moves either in or out in response to an upward or downward pitching movement of the helicopter. Output rod 92 is connected to a force amplifying hydraulic servo device 94. This servo device 94 accepts the low force rate gyro output as its input and moves a rod 96 an amount proportional to the input movement with a greater force. The servo device 94 has a second rod 98 extending therefrom in line with rod 96. Rod 98 is fixedly mounted to the servo device 94 and extends from the device a distance equal to that of rod 96 in its null or predetermined flight position. An actuating lever 100 is pivotally mounted on the end of rod 98 at 99. The free end of rod 96 is operatively connected to lever 100 by a pivotal connection at 101 for operating it. As the rod 96 is moved in and out of the servo device 94, it can be seen that actuating lever 100 pivots about the end of rod 98 at 99 in a plane which passes through the longitudinal axes of both rods 96 and 98. The axis which passes through the free end 99 of rod 98 and about which lever 100 pivots is axis "A."

The upper end of actuating lever 100 has output rod 84 pivotally connected thereto. Rod 84 is pivotally connected at its other end to one end of bar 82 at 103, as set forth above.

Actuating lever 100 has a rod 102 extending through its lower end normal to the plane which passes through lever 100 in the longitudinal axes of both rods 96 and 98. This rod 102 is fixed against axial movement while being permitted to rotate with respect to the end of said lever 100. The portion 105 of rod 102 extending on one side of actuating lever 100 is fixed to the lower end of a leaf spring 104. The portion 107 of rod 102 extending on the other side of lever 100 is connected to the bottom of leaf spring 106. The top of leaf springs 104 and 106 are fixed to a shaft 108 which has its longitudinal and rotative axis coincident with axis "A" referred to above. These leaf springs may be fixed to the shaft by many means desired such as by set screws 110. At the point where actuating lever 100 crosses axis "A," shaft 108 is bent therearound as at 112. One end of shaft 108 extends into a rotary damper 114 and is under the influence thereof. If necessary, other portions of shaft 108 can be supported by bearing units. A lever 116 is also fixed to the shaft 108 and moves therewith. The free end of lever 116 has output rod 86 pivotally connected thereto. Rod 86 is pivotally connected at its other end at 118 of bar 82, as set forth above.

The rotary damper 114 is very stiff and will not permit immediate motion of its shaft. However, if the twisting force or torque applied by springs 104 and 106 to shaft 108 is maintained, the damper shaft gradually rotates thereby moving lever 116 and its connected parts. The damper is of the type which permits a predetermined shaft speed for a given torque applied. This damper can be preset so that various shaft speeds can be obtained for a range of torques to be applied. A damper of this type is well-known in the prior art and need not be specifically described at this time.

While the device embodying the present invention is only shown and described connected to the swash plate mechanism so as to move it about one axis, a similar device is installed to operate through link 75 to rotate the swash plate mechanism about an axis 90° to the lateral axis about which automatic movement has already been described. Since the device shown has been described as responsive to unwanted changes in pitch of the helicopter, the second device would control unwanted movement with reference to roll. This arrangement compensates for all pitch and roll movements. Below, only the operation of the device as it concerns stabilizing pitching movements will be described since the operation of the device as it pertains to roll is the same. Means can be incorporated to disconnect said device from having a controlling effect when desired. This could be a pilot actuated means for fixedly holding the output rod from the gyro or amplifier. Any of the operating linkage can be supported for movement by conventional bearing means when necessary.

FIG. 2 includes a rate gyro 90a which is similar to gyro 90 in that it senses the rate of angular displacement of the helicopter. The output of said rate gyro 90a, however, is a direct current electrical signal. This rate signal can also be obtained from a vertical gyro with a rate network connected to its output. This signal is carried to a lag-lead network 200 by a conduit 202. The lag-lead network 200 permits a portion of said signal to pass therethrough to a resistor 204 through conduit 206. This resistor permits a predetermined percentage of the signal to pass therethrough. The signal from the resistor 204 passes to modulator 206 through conduit 208. This modulator changes the direct current to alternating current. This A.C. signal is then sent to a servo amplifier 210 by a conduit means 212. The amplified signal output from the servo amplifier drives an electrical motor 214.

The output shaft 216 of motor 214 operates a servo valve 20a which is similar to the servo valve 20 as shown in FIG. 1. A potentiometer 218 is mounted on shaft 216 and the signal therefrom is fed back to the servo amplifier 210. This servo valve 20a operates a power unit 22a in the same manner as servo valve 20 operates the power unit 22 described for FIG. 1 above. The output of the power unit 22a is connected to the bell crank lever 78a which is in turn connected to a swash plate mechanism by a link 74a. The swash plate mechanism in turn changes the cyclic pitch of the rotor blades to return the helicopter to its desired flight attitude. If the portion of the signal permitted to pass through the lag-lead network is not enough to immediately overcome the disturbance or undesired movement of the helicopter from its set attitude, the lag-lead network 200 permits an increased portion of the signal to pass therethrough thereby increasing the movement of the motor 214 and in turn increasing the change made in the swash plate mechanism by the original portion which was permitted to pass through the lag-lead network 200.

It is to be understood that a lag-lead network can be varied to achieve the desired amount of signal which is wanted immediately and the time constant of the network can be arrived at to have it permit the greater portion of the signal to pass through in a desired time period.

*Operation*

Let us assume that a helicopter in flight pitches in an undesired manner. This pitch movement will be detected by the rate gyro 90 and move its output rod 92 in a direction to counteract said movement. Rod 92 operates the force amplifying hydraulic servo device 94 so that its rod 96 moves an amount proportional to the input movement. Let us assume that to bring the helicopter back to its desired attitude the rod 96 moves into the device 94.

This movement pivots the actuating lever 100 so that its upper end moves away from said device 94 and its lower end is drawn towards the device 94. The movement of the upper end of actuating lever 100 is transferred by rod 84 to the upper end of differential operating bar 82 at 103, which movement pivots bar 82 about its lower end at 118. This is true in view of the fact that the rotary damper 114 is very stiff and will not permit immediate motion of its shaft. It can be seen that this lower end of bar 82 is connected at 118 to the damper through rod 86 and lever 116.

This movement of the link 82 about 118 moves the piston unit of servo valve 20 to the right through piston or actuating rod 52. As this piston unit moves to the right, piston 26 permits passageway 66 to be connected to drain 58 and piston 28 permits passageway 68 to be connected to fluid pressure line 54. As fluid pressure builds up in passageway 68 and the portion of bore 62 to the right of piston 60, the housing 24 is moved to the right. As this housing 24 moves to the right, the fluid in the bore 62 to the left of piston 60 is forced through passageway 66 to drain.

The movement of housing 24 is transmitted through the arm 70 extending therefrom to the arm 78 of bell crank lever 72. The movement of bell crank lever 72 is transmitted through its other arm 80 to the swash plate mechanism by link 74. This movement of the swash plate mechanism changes the cyclic pitch of the blades 14 in a way to bring the helicopter back to its predetermined flight attitude.

As the helicopter resumes its predetermined flight attitude, this is also sensed by the rate gyro 90 and the device is returned to its "null" position.

When the upper end of actuating lever 100 moves rod 84 in the manner just described, the lower end of lever 100 swings bar 102 through an arc therewith. This movement of bar 102 moves the lower ends of both leaf springs 104 and 106 towards the device 94. This movement of springs 104 and 106 places a torque upon shaft 108 which extends into damper 114.

Due to the action of damper 114, the shaft 108 will only be permitted to rotate at a predetermined speed dependent on the torque applied. If the action of the movement of the rod 84 directly on the servo mechanism is sufficient to immediately overcome the disturbance or undesired pitch movement, the output rod 86 is not moved to provide control in view of the resistance of the damper 114 to immediate motion of its shaft 108. However, if the disturbance or undesired pitch movement persists, the rod 96 of the servo device 94 remains displaced, with the springs 104 and 106 in bent position. In attempting to straighten out, the leaf springs 104 and 106 rotate shaft 108, and since the correction to the rotor blades has still not returned the helicopter to its desired flight attitude, the damper shaft 108 gradually moves at a predetermined speed dependent on the torque applied by the springs 104 and 106. This movement of shaft 108 rotates lever 116 to the right and this in turn moves the lower end of differential operating bar 82 at 118 through rod 86. This provides additional control in order to bring the helicopter back to its desired flight attitude.

It is to be understood that the invention is not limited to the specific embodiment herein illustrated and described, but may be used in other ways without departure from its spirit as defined by the following claims.

I claim:

1. In an automatic stabilization device for an aircraft, means for sensing the changes in pitch movement, means for controlling the attitude of said aircraft, means connecting said sensing means and operating means having two output members, one of said output members being directly connected between said sensing means and operating means to actuate said operating means immediately when a change is sensed by the sensing means, and the other of said output members being connected between said sensing means and operating means to actuate said operating means after a predetermined time delay after a change is sensed by the sensing means.

2. In a helicopter, a rotor head mounted thereon having rotor blades mounted to change pitch, first means for changing the pitch of said blades, second means for automatically operating said last named means including a helicopter attitude sensing device, said sensing device having a direct connection to said first means for changing the pitch of said blades providing an immediate movement thereof, and said sensing device having a second connection to said first means for changing the pitch of said blades providing a delayed movement thereof.

3. In a helicopter, a rotor head mounted thereon having rotor blades mounted to change pitch, first means for changing the pitch of said blades, second means connected to said first means for changing the pitch of said blades providing an immediate movement thereof, third means connected to said first means for changing the pitch of said blades providing a delayed movement thereof, fourth means for automatically operating said second and third means including a helicopter attitude sensing device, said fourth means producing two output signals, fifth means for transmitting one of said signals to said second means, and sixth means for transmitting the other of said signals to said third means.

4. In a helicopter, a rotor head mounted thereon having rotor blades mounted to change pitch, first means for changing the pitch of said blades, second means for automatically operating said last named means including a helicopter attitude sensing device, an actuating lever pivotally mounted between its ends, said sensing device having a connection to said lever to pivot it, one end of said lever having a direct connection to said first means for changing the pitch of said blades providing an immediate movement thereof, and the other end of said lever having a connection to said first means for changing the pitch of said blades providing a delayed movement thereof.

5. In a helicopter, a rotor head mounted thereon having rotor blades mounted to change pitch, first means for changing the pitch of said blades, second means for automatically operating said last named means including a helicopter attitude sensing device, said sensing device having a direct first connection to said first means for changing the pitch of said blades providing an immediate movement thereof, and said sensing device having a second connection to said first means for changing the pitch of said blades providing a delayed movement thereof, said second connection including a damper, said damper having a member which resists movement, said member being connected to said first means, said second connection including spring means movable by said sensing device to place a force on said member to move it against the effect of the damper.

6. In a helicopter, a rotor head mounted thereon having rotor blades mounted to change pitch, first means for changing the pitch of said blades, said first means having a differential operating means with two inputs, second means connected to one of said inputs for providing an immediate movement of said first means, third means connected to the other of said inputs for providing a delayed movement of said first means, fourth means for automatically operating said second and third means including a helicopter attitude sensing device, said fourth means producing two output signals, fifth means for transmitting one of said signals to said second means, and sixth means for transmitting the other of said signals to said third means.

7. In a helicopter, a rotor head mounted thereon having rotor blades mounted to change pitch, first means for changing the pitch of said blades, second means connected to said first means for changing the pitch of said blades providing an immediate movement thereof, third means connected to said first means for changing the pitch of said blades providing a delayed movement thereof, fourth means for automatically operating said second and third means including a helicopter attitude sensing device, said fourth means producing two output signals, fifth means for transmitting one of said signals to said second means, and sixth means for transmitting the other of said signals to said third means, said third means including a damper having a member which resists movement, said member being connected to said first means, said third means including spring means connected to said member and said sixth means, said spring means being biased by the signal transmitted by said sixth means to place a force upon said member to move it against the effect of the damper.

8. In a helicopter, a rotor head mounted thereon having rotor blades mounted to change pitch, first means for changing the pitch of said blades, second means for automatically operating said last named means including a helicopter attitude sensing device, said second means having third means providing a direct connection to said first means for changing the pitch of said blades providing an immediate movement thereof, and said second means having fourth means providing a connection to said first means for changing the pitch of said blades providing a delayed movement thereof, said second means producing two output signals, one of said signals being received by said third means, the other of said signals being received by said fourth means.

9. An automatic stabilization device for an aircraft comprising, an aircraft attitude sensing means, said sensing means having an output means, an actuating lever pivotally mounted between its ends, means connecting said output means to said actuating lever so that said output means can pivot said actuating lever about its pivotal mounting, a differential actuating means having two input connections and one output connection, means connecting one end of said actuating lever to one input connection of said differential actuating means for actuating said output connection immediately, and means connecting the other end of said actuating lever to the other input connection of said differential actuating means for actuating said output connection after a time delay.

10. An automatic stabilization device for an aircraft comprising, an aircraft attitude sensing means, said sensing means having an output means, an actuating lever pivotally mounted between its ends, means connecting said output means to said actuating lever so that said output means can pivot said actuating lever about its pivotal mounting, a differential actuating means having two input connections and one output connection, means connectig one end of said actuating lever to one input connection of said differential actuating means, damping means having a shaft operatively connected thereto, spring means connecting the other end of the actuating lever to said shaft for applying torque to said shaft upon movement of this other end of the actuating lever, an arm extending from said shaft, and means connecting said arm to the other input connection of said differential actuating means.

11. An automatic stabilization device for an aircraft comprising, an aircraft attitude sensing means, said sensing means having an output means, an actuating lever pivotally mounted between its ends about an axis, means connecting said output means to said actuating lever so that said output means can pivot said actuating lever about the axis, a differential actuating means having two input connections and one output connection, means connecting one end of said actuating lever to one input connection of said differential actuating means, damping means having a shaft operatively connected thereto, said shaft having an axis about which it can rotate, the axis of said shaft coinciding with the axis about which the actuating lever pivots, spring means connecting the other end of the actuating lever to said shaft for applying torque to said shaft upon movement of this end of the actuating lever, an arm extending from said shaft, and means connecting said arm to the other input connection of said differential actuating means.

12. An automatic stabilization device for an aircraft comprising, an aircraft attitude sensing means, said sensing means having an output means, an actuating lever pivotally mounted between its ends about a pivotal axis, means connecting said output means to said actuating lever so that said output means can pivot said actuating lever about the pivotal axis, a differential actuating means having two input connections and one output connection, means connecting one end of said actuating lever to one input connection of said differential actuating means, damping means having a shaft operatively connected thereto, said shaft having an axis about which it can rotate, the axis of said shaft coinciding with the pivotal axis about which the actuating lever pivots, the other end of said actuating lever having a member connected thereto which extends therefrom substantially parallel to its pivotal axis, spring means connecting said member of the actuating lever to said shaft for applying torque to said shaft upon movement of this member, an arm extending from said shaft, and means connecting said arm to the other input connection of said differential actuating means.

13. An automatic stabilization device for an aircraft comprising, an aircraft attitude sensing means, said sensing means having an output means, an actuating lever pivotally mounted between its ends about a pivotal axis, means connecting said output means to said actuating lever so that said output means can pivot said actuating lever about the pivotal axis, a differential actuating means having two input connections and one output connection, means connecting one end of said actuating lever to one input connection of said differential actuating means, damping means having a shaft operatively connected thereto, said shaft having an axis about which it can rotate, the axis of said shaft coinciding with the pivotal axis about which the actuating lever pivots, the other end of said actuating lever having a member connected thereto which extends therefrom substantially parallel to its pivotal axis, a leaf spring connecting said member of the actuating lever to said shaft for applying torque to said shaft upon movement of this member, an arm extending from said shaft, and means connecting said arm to the other input connection of said differential actuating means.

14. An automatic stabilization device for an aircraft comprising, an aircraft attitude sensing means, said sensing means having an output means, an actuating lever pivotally mounted between its ends about a pivotal axis, means connecting said output means to said actuating lever so that said output means can pivot said actuating lever about the pivotal axis, a differential actuating means having two input connections and one output connection, means connecting one end of said actuating lever to one input connection of said differential actuating means, damping means having a shaft operatively connected thereto, said shaft having an axis about which it can rotate, the axis of said shaft coinciding with the pivotal axis about which the actuating lever pivots, the other end of said actuating lever having a member connected thereto which extends therefrom substantially parallel to its pivotal axis, a leaf spring extending between said member of the actuating lever and said shaft for applying torque to said shaft upon movement of this member, an arm extending from said shaft, and means connecting said arm to the other input connection of said differential actuating means.

15. An automatic stabilization device for an aircraft comprising an aircraft attitude sensing means, said sensing means having an output means, an actuating lever pivotally mounted between its ends, means connecting said output means to said actuating lever so that said output means can pivot said actuating lever about its pivotal mounting, a differential actuating lever having two input connections one at each end and one output connection between its ends, means connecting one end of said actuating lever to one input connection of said differential actuating lever, damping means having a shaft operatively connected thereto, spring means connecting the other end of the actuating lever to said shaft for applying torque to said shaft upon movement of this end of the actuating lever, an arm extending from said shaft, and means connecting said arm to the other input connection of said differential actuating lever.

16. A device for stabilizing a craft about an axis of rotation including in combination means for providing a command quantity proportional to rate of craft rotation about said axis, frequency-sensitive means having an input and an output and providing a ratio of output to input varying from a minimum value greater than zero as frequency increases without limit to larger values as frequency approaches zero, means coupling the command quantity to the input of the frequency-sensitive means and means responsive to the output of the frequency-sensitive means for controlling rotation of the craft about said axis.

17. A craft stabilizing device as in claim 16 in which the frequency-sensitive means includes a spring and a damper.

18. A craft stabilizing device as in claim 16 in which the frequency-sensitive means includes an electrical circuit having a predetermined time constant.

19. In combination in an aircraft; first means for sensing the changes in position of an aircraft; second means for controlling the attitude of an aircraft; third means connecting said sensing means and operating means; said connecting means including a spring and a damper unit, an actuating member having an output to actuate said second controlling means, said spring being located between said first sensing means and said actuating member, said actuating member having its movement controlled by said damper.

20. In combination in an aircraft, an aircraft attitude sensing means, said sensing means having an output means, an actuating lever pivotally mounted about an axis, means connecting said output means to said actuating lever so that said output means can pivot said lever about its axis, means for controlling the attitude of an aircraft, an actuating member having an output to actuate said controlling means, means connecting one end of said actuating lever to said actuating member, said connecting means including spring means for applying a force on said actuating member upon movement of the actuating lever, damping means being connected to said actuating member to control its movement.

21. In combination in an aircraft, an aircraft attitude sensing means, said sensing means having an output means, an actuating lever pivotally mounted about a pivotal axis, means connecting said output means to said actuating lever so that said output means can pivot said actuating lever about the pivotal axis, means for controlling the attitude of an aircraft, an actuating arm, damping means having a shaft operatively connected thereto, said actuating arm being fixedly mounted to said shaft of said damping means, the other end of said arm being connected to said means for controlling the attitude of an aircraft, spring means connecting the actuating lever to said shaft of said damping means for applying torque to said shaft.

References Cited in the file of this patent

UNITED STATES PATENTS

| | | |
|---|---|---|
| 2,234,326 | Tiebel | Mar. 11, 1941 |
| 2,678,177 | Chenery | May 11, 1954 |
| 2,844,338 | Keith | July 22, 1958 |
| 2,919,081 | Schon | Dec. 29, 1959 |